(12) United States Patent
McIntosh

(10) Patent No.: US 8,028,544 B2
(45) Date of Patent: Oct. 4, 2011

(54) HIGH DELIVERY TEMPERATURE ISOPIPE MATERIALS

(75) Inventor: Joseph James McIntosh, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 101 days.

(21) Appl. No.: 12/391,750

(22) Filed: Feb. 24, 2009

(65) Prior Publication Data

US 2010/0212363 A1 Aug. 26, 2010

(51) Int. Cl.
*C03B 7/00* (2006.01)
*C04B 35/584* (2006.01)

(52) U.S. Cl. ............. 65/374.13; 264/683; 501/97.1

(58) Field of Classification Search .......... 65/374.13; 264/683, 665; 501/97.1
See application file for complete search history.

(56) References Cited

U.S. PATENT DOCUMENTS

| | | | |
|---|---|---|---|
| 3,338,696 A | 8/1967 | Dockerty | 65/145 |
| 3,437,470 A | 4/1969 | Overman | 65/195 |
| 3,682,609 A | 8/1972 | Dockerty | 65/83 |
| 4,830,655 A * | 5/1989 | Franek et al. | 65/286 |
| 4,834,926 A * | 5/1989 | Iwasaki et al. | 264/665 |
| 6,974,786 B2 | 12/2005 | Helfinstine et al. | 501/106 |
| 7,238,635 B2 | 7/2007 | Ames et al. | 501/106 |
| 2003/0121287 A1 | 7/2003 | Chalk et al. | 65/90 |
| 2004/0055338 A1 | 3/2004 | Helfinstine et al. | 65/374.13 |
| 2007/0142207 A1 | 6/2007 | Helfinstine et al. | 501/106 |
| 2008/0202164 A1 | 8/2008 | Hoysan | 65/90 |
| 2008/0202165 A1 | 8/2008 | Hoysan et al. | 65/90 |

FOREIGN PATENT DOCUMENTS

| | | |
|---|---|---|
| JP | 11-246230 | 3/1998 |
| JP | 11-246230 | 9/1999 |
| WO | WO2005121035 | 12/2005 |
| WO | WO2005121182 | 12/2005 |
| WO | WO2006073841 | 7/2006 |
| WO | WO2006115792 | 11/2006 |

OTHER PUBLICATIONS

Choi, Sung R. et al., *Silicon Nitride Creep Under Various Specimen-Loading Configurations*, 1-35, NASA/TM 2000-210026 (Nov. 2000).

Backhaus-Ricoult, M., "Identification of oxidation mechanisms in silicon nitride ceramics by transmission electron microscopy studies of oxide scales," J. Mater. Res., 1995, 10: 2306-2321.

(Continued)

*Primary Examiner* — Matthew Daniels
*Assistant Examiner* — Erin Snelting
(74) *Attorney, Agent, or Firm* — Siwen Chen; Maurice M. Klee

(57) ABSTRACT

Isopipes (13) for making a glass or a glass-ceramic using a fusion process are provided. The isopipes are made from a silicon nitride refractory material that is: (a) produced in block form in an atmosphere having a $pO_2$ of less than 0.1 using less than 10 weight percent of one or more sintering aids, (b) machined into an isopipe configuration, and (c) exposed to a partial pressure of oxygen equal to or greater than 0.1 for a period of time and at a temperature sufficient to form a $SiO_2$ layer (31) which exhibits substantially only a passive oxidation mechanism. The $SiO_2$ layer (31) serves as a protective barrier for further oxidation of the silicon nitride during use of the isopipe (13). The isopipes (13) exhibit less sag during use than isopipes composed of zircon.

20 Claims, 1 Drawing Sheet

OTHER PUBLICATIONS

Luthra, K. L., "*Some New Perspectives on Oxidation of Silicon Carbide and Silicon Nitride,*" J. Am. Ceram. Soc., 1991, 74:1095-1103.

Themelin et al., "*Oxidation Behavior of a Hot Isostatically Pressed Silicon Nitride Material,*" Journal De Physique IV, vol. 3, Dec. 1993, pp. 881-888.

Varshneya, Arun K., "*Flat Glass,*" "*Fundamentals of Inorganic Glasses*", Academic Press, Inc., Boston, 1994, Chapter 20, Section 4.2., 534-540.

Vaughn, W. L., "*Active-to-Passive Transition in the Oxidation of Silicon Carbide and Silicon Nitride in Air,*" J. Am. Ceram. Soc., 1990, 73: 1540-1543.

Engineered Materials Handbook vol. 4: "*Ceramics and Glasses*", Volume Chairman: Dr. Samuel J. Schneider, Jr., ASM International, Materials Park, OH, 1991, pp. 30, 191, 316, 807, 808, and 815.

Professional translation of JP 11-246230.

\* cited by examiner

HIGH DELIVERY TEMPERATURE ISOPIPE MATERIALS

FIELD

This disclosure relates to isopipes used in the production of sheet glass by the fusion process and, in particular, to techniques for reducing the sag which such isopipes exhibit during use.

DEFINITIONS

The word "isopipe" is used in the specification and claims to refer generically to a body having a configuration suitable for use as a glass forming structure in a fusion downdraw process, irrespective of the particular shape and construction of the body or whether formation of the body involves isopressing or not.

The phrase "silicon nitride material" is used in the specification and claims to refer to a refractory material which comprises at least 34 wt. % N and at least 51 wt. % Si.

BACKGROUND

A. Glass Substrates for Flat Panel Displays

Manufacturers of flat panel displays, such as, liquid crystal displays (LCDs), use glass substrates to produce multiple displays simultaneously, e.g., six or more displays at one time. The width of a substrate limits the number of displays that can be produced on a single substrate, and thus wider substrates correspond to increased economies of scale. Also, display manufacturers need wider substrates to satisfy a growing demand for larger size displays.

In addition, such manufacturers are seeking glass substrates that can be used with polycrystalline silicon devices that are processed at higher temperatures (hereinafter referred to as "poly-silicon" applications). In particular, a need exists for high strain point glass compositions that do not undergo compaction during display manufacture. Such glasses generally require higher forming temperatures, thus leading to a need for improved forming structures (isopipes) for use in the fusion process.

B. Fusion Process

The fusion process is one of the basic techniques used in the glass making art to produce sheet glass. See, for example, Varshneya, Arun K., "Flat Glass," Fundamentals of Inorganic Glasses, Academic Press, Inc., Boston, 1994, Chapter 20, Section 4.2, 534-540. Compared to other processes known in the art, e.g., the float and slot draw processes, the fusion process produces glass sheets whose surfaces have superior flatness and smoothness. As a result, the fusion process has become of particular importance in the production of the glass substrates used in the manufacture of flat panel display devices, e.g., liquid crystal displays (LCDs).

The fusion process, specifically, the overflow downdraw fusion process, is the subject of commonly-assigned U.S. Pat. Nos. 3,338,696 and 3,682,609, to Stuart M. Dockerty, the contents of which are incorporated herein by reference. A schematic drawing of the process of these patents is shown in FIG. 1. As illustrated therein, the system includes a supply pipe 9 which provides molten glass to a collection trough 11 formed in a free-space spanning, refractory body 13 known as an "isopipe."

Once steady state operation has been achieved, molten glass passes from the supply pipe to the trough and then overflows the weirs 19 (i.e., the tops of the trough on both sides; see FIGS. 2 and 3), thus forming two sheets of glass that flow downward and inward along the outer surfaces of the isopipe. The two sheets meet at the bottom or root 15 of the isopipe, where they fuse together into a single sheet, e.g., a sheet having a thickness of ~700 microns. The single sheet is then fed to drawing equipment (represented schematically by arrows 17 in FIG. 1), which controls the thickness of the sheet by the rate at which the sheet is drawn away from the root.

A vertical temperature gradient imposed on the isopipe is used to manage the viscosity of the glass. At the root of the isopipe, the glass viscosity is typically in the range of approximately 100 to 300 kP.

As can be seen in FIG. 1, the outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

As is evident from the foregoing, isopipe 13 is critical to the success of the fusion process as it makes direct contact with the glass during the forming process. Thus, the isopipe needs to fulfill strict chemical and mechanical requirements to have a lifetime that is not too short and to deliver a quality sheet glass product. For example, the isopipe should not be rapidly attacked by or be the source of defects in the glass. Also, it should be able to withstand a vertical temperature gradient of, for example, 100° C. during use, and transient gradients larger than that during heat up. In addition, the rate of deflection due to creep at the use temperature should be low.

In particular, the dimensional stability of the isopipe is of great importance since changes in isopipe geometry affect the overall success of the fusion process. See, for example, Overman, U.S. Pat. No. 3,437,470, and Japanese Patent Publication No. 11-246230.

Significantly, the conditions under which the isopipe is used make it susceptible to dimensional changes. Thus, the isopipe operates at elevated temperatures on the order of 1000° C. and above. Moreover, the isopipe operates at these elevated temperatures while supporting its own weight as well as the weight of the molten glass overflowing its sides and in trough 11, and at least some tensional force that is transferred back to the isopipe through the fused glass as it is being drawn. Depending on the width of the glass sheets that are to be produced, the isopipe can have an unsupported length of two meters or more. Current business trends are towards ever larger glass sheets requiring ever larger isopipes for their formation. For an isopipe span on the order of 13 feet, the weight of an isopipe made from zircon (see below) is estimated to be in excess of 15,000 pounds.

C. Zircon Isopipes

To withstand the above demanding conditions, isopipes 13 have been manufactured from isostatically pressed blocks of refractory material (hence the name "iso-pipe"). In particular, isostatically-pressed zircon refractories, such as those sold by St. Gobain-SEFPRO of Louisville, Ky., have been used to form isopipes for the fusion process.

Use of a zircon isopipe limits the fusion process in two ways. First, zircon dissolves into the glass at hotter regions near the weirs of the isopipe, and then precipitates in the cooler regions near the root to form secondary zircon crystals. See U.S. Patent Publication No. 2003/0121287, published Jul. 3, 2003, the contents of which are incorporated herein by reference. These crystals can be sheared off by the glass flow, and become inclusions in the sheet. Secondary crystals incorporated into the drawn glass are visual defects. Panels with such defects are rejected. Secondary zircon precipitation has been controlled by restricting the weir-root temperature difference to less than about 100° C., thereby limiting the types of glasses that can be fusion formed to the high standards of glass quality required by display manufacturers because only glasses which have the requisite viscosity properties over this temperature range can be used. An isopipe material which did not have the secondary zircon problem would allow the forming process window to be expanded. An expanded operating window, in turn, makes yield improvements possible. Further, some new glasses may require operation in a higher temperature regime where the zircon family is no longer suitable.

Second, zircon also restricts the lifetime and operating temperature range of an isopipe because of its high temperature creep characteristics. Creep is the permanent change in the physical shape of a refractory or other material as a result of an imparted stress usually at elevated temperature. The creep acts in such a way as to relieve the stress, and is usually attributed to grain boundary sliding or material diffusion. An isopipe undergoing creep sags in the middle and deforms the weirs over which the glass flows. When the weirs are no longer straight, the glass flow distribution across the length is disturbed and it becomes more difficult and eventually impossible to manage glass sheet formation, thus ending production.

At high temperature, zircon decomposes to silica liquid and zirconia. Silica liquid at grain boundaries increases the creep rate. This makes firing the refractory a compromise between microstructural quality and creep behavior. Display glass drawn on an isopipe with excessive creep deformation cannot meet the uniform thickness requirements because as discussed above, the weirs deform which changes the mass distribution across the isopipe eventually exceeding the compensational capability of conventional operational tools.

Thus, even though zircon is considered to be a high performance refractory material, in practice, isopipes composed of commercially available zircon exhibit dimensional changes which limit their useful life.

D. Intrinsic Rate of Creep

In view of the foregoing, it is desirable to reduce the intrinsic rate of creep for any material used as an isopipe to: 1) enable use of a wider pipe, 2) extend the fusion draw process to higher temperature glasses (e.g., higher strain point glass that is more compatible with poly-silicon display manufacturing processes), and/or 3) extend the service life of the isopipe and thus minimize process down time and replacement costs.

Analysis shows that the rate of isopipe sag is proportionate to its length raised to the fourth power and inversely proportionate to the square of its height. A doubling in the length of the isopipe (with the same life requirement and temperature capability) requires either a 16 fold decrease in intrinsic creep rate or a four fold increase in height. The current process for fabrication of zircon isopipes (cold isostatic pressing followed by sintering) cannot accommodate a four fold increase in isopipe height. The maximum length for a zircon isopipe which still has a reasonable service life has thus in essence been reached in the art or shortly will be reached with the current isopipe manufacturing technology. Accordingly, the ability to satisfy future requirements of flat panel display manufacturers for larger substrates will be substantially compromised with current technology.

As discussed below, the present disclosure provides isopipes that have significantly improved creep rates compared to isopipes made from commercially available zircon, e.g., well below the 16-fold decrease in creep rate needed to compensate for a doubling in the length of an isopipe. As also discussed below, the isopipes have a silica coating that is compatible with the types of glass compositions used to make substrates for flat panel displays.

Accordingly, these isopipes are well-suited for producing flat glass by the fusion process because they can address some or all of the length, processing temperature, and/or sag problems of isopipes made from existing refractory materials, specifically, commercially available zircon. By addressing these problems, cost reductions can be achieved in, for example, the following ways: (1) longer isopipe lifetimes requiring less rebuild; (2) an expanded process window enabling yield improvements; (3) long term stability of isopipe shape allowing for reduced complexity of operation, especially near the end of an isopipe's life; and/or (4) increased glass delivery temperatures to the isopipe (~1300° C. and higher) thus allowing the platinum delivery system to be shortened thus reducing material costs.

SUMMARY

An isopipe (13) for making a glass or a glass-ceramic (e.g., a display glass or a display glass-ceramic) is disclosed which comprises a body having a configuration adapted for use in a fusion process, said body comprising a silicon nitride refractory material that:

(a) contacts the glass or glass-ceramic in a molten state during use of the isopipe (13), (b) is compatible with the molten glass or molten glass-ceramic in that said contact of the molten glass or molten glass-ceramic with the silicon nitride refractory material does not result in a defect level which is above 0.1 defects per pound in the finished glass or finished glass-ceramic (in one embodiment, below 0.01 defects per pound; in another embodiment, below 0.001 defects per pound), and (c) has a flexural creep strain rate (also known as an intrinsic creep strain rate) at 1250° C. and 1000 psi that is less than $1\times10^{-6}$/hour (in one embodiment, less than $1\times10^{-7}$/hour; in another embodiment, less than $1\times10^{-8}$/hour), wherein:

(i) the silicon nitride refractory material is produced in block form in an atmosphere having a $pO_2$ of less than 0.1 (in one embodiment, less than 0.01) using less than 10 weight percent of one or more sintering aids (in one embodiment, less than or equal to 7 weight percent);

(ii) the block form of silicon nitride refractory material is machined into the body; and (iii) the machined block of silicon nitride refractory material is treated by exposure to a partial pressure of oxygen equal to or greater than 0.1 (in one embodiment, equal to greater than 0.2) for a period of time (in one embodiment, for at least 12 hours; in another embodiment, for at least 24 hours) and at a temperature (in one embodiment, at a temperature equal to or greater than 1000° C.; in another embodiment, at a temperature of approximately 1200° C.) sufficient to form a $SiO_2$ layer (31) which exhibits substantially only a passive oxidation mechanism, said $SiO_2$ layer (which is considered part of the silicon nitride material) serving as a protective barrier for further oxidation of the silicon nitride during use of the isopipe (13).

A method of making an isopipe (13) which has a configuration adapted for use in a fusion process is disclosed which includes in order:

(a) providing a block of a silicon nitride refractory material which was produced in an atmosphere having a $pO_2$ of less than 0.1 (in one embodiment, less than 0.01) using less than 10 weight percent of one or more sintering aids (in one embodiment, less than or equal to 7 weight percent);

(b) machining the block into an isopipe configuration; and (c) exposing the machined block to a partial pressure of oxygen equal to or greater than 0.1 (in one embodiment, equal to greater than 0.2) for a period of time (in one embodiment, for at least 12 hours; in another embodiment, for at least 24 hours) and at a temperature (in one embodiment, at a temperature equal to or greater than 1000° C.; in another embodiment, at a temperature of approximately 1200° C.) sufficient to form a $SiO_2$ layer (31) which exhibits substantially only a passive oxidation mechanism, said $SiO_2$ layer (which is considered part of the silicon nitride material) serving as a protective barrier for further oxidation of the silicon nitride during use of the isopipe (13).

A method for reducing the sag of an isopipe (13) used in a fusion process that produces glass or glass-ceramic sheets is disclosed which includes forming said isopipe (13) from a silicon nitride refractory material that is:

(a) produced in block form in an atmosphere having a $pO_2$ of less than 0.1 (in one embodiment, less than 0.01) using less than 10 weight percent of one or more sintering aids (in one embodiment, less than or equal to 7 weight percent), (b) machined into an isopipe configuration, and (c) exposed to a partial pressure of oxygen equal to or greater than 0.1 (in one embodiment, equal to greater than 0.2) for a period of time (in one embodiment, for at least 12 hours; in another embodiment, for at least 24 hours) and at a temperature (in one embodiment, at a temperature equal to or greater than 1000° C.; in another embodiment, at a temperature of approximately 1200° C.) sufficient to form a $SiO_2$ layer (31) which exhibits substantially only a passive oxidation mechanism, said $SiO_2$ layer (which is considered part of the silicon nitride material) serving as a protective barrier for further oxidation of the silicon nitride during use of the isopipe (13).

The reference numbers used in the above summaries are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIG. 2 shows the isopipe prior to post-formation treatment and FIG. 3 shows it after the treatment. As in FIG. 1, these drawings are not intended to indicate scale or relative proportions of the elements shown therein. In particular, protective coating 31 has been enlarged for purposes of illustration.

DETAILED DESCRIPTION OF THE PREFERRED EMBODIMENTS

Figure 1:
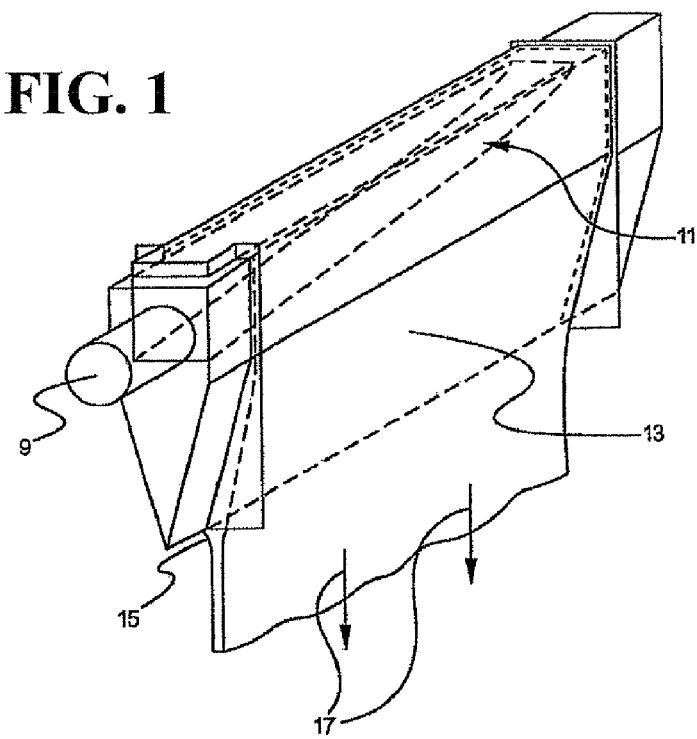
FIG. 1 is a schematic drawing illustrating a representative construction for an isopipe for use in an overflow downdraw fusion process for making flat glass sheets. This drawing is not intended to indicate scale or relative proportions of the elements shown therein.
Figure 2:
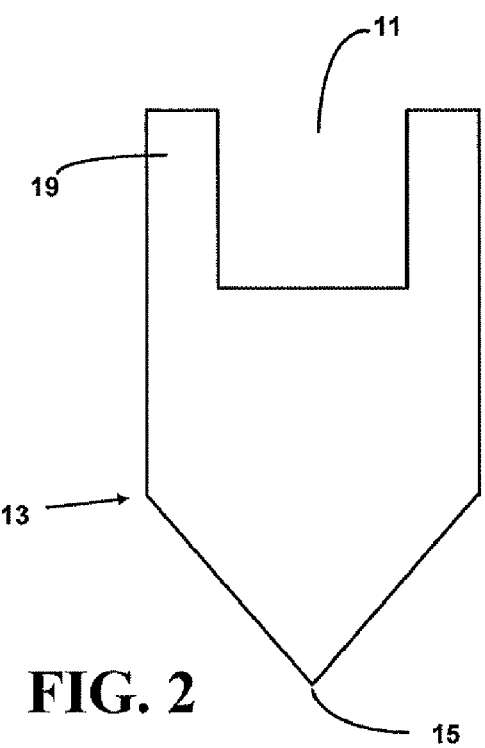
FIGS. 2 and 3 are schematic drawings illustrating a protective silica layer 31 produced by post-formation treatment of the outer surface of a silicon nitride isopipe.
Figure 3:
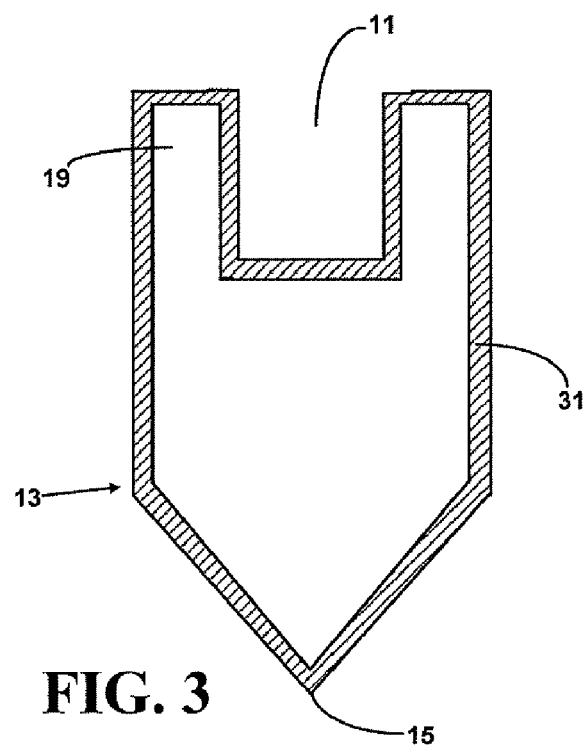

Silicon nitride is a widely used material as a cutting tool and in such applications as turbine blades and bearings. It is also used in the semiconductor industry. However, to applicant's knowledge, it has not been used in the glass making industry under conditions where the silicon nitride could come into contact with molten oxide glasses. In particular, it has not been used under such conditions in the manufacture of isopipes for use in the fusion downdraw process.

The reason for this lack of use is basically a prejudice against bringing non-oxide materials into contact with an oxide glass. It has previously been thought that such contact will have adverse effects on the glass, including the generation of bubbles at the glass/silicon nitride interface, e.g., nitrogen bubbles.

In accordance with the present disclosure, the problem has been viewed from a new perspective in which the manner in which the silicon nitride is manufactured and treated prior to use is considered as playing an important role in an isopipe's susceptibility to bubble formation.

Silicon nitride is difficult to sinter. Thus, it is normally sintered under applied pressure and with the use of sintering aids. The applied pressure is normally free of oxygen, e.g., approximately 95% of all silicon nitride is formed in an inert atmosphere. As a consequence, the exposed surface of the silicon nitride is capable of reacting with molten oxide glasses to produce nitrogen gas which has the potential to form bubbles. However, in accordance with the present disclosure, this problem can be overcome by post-formation treatment of the silicon nitride in an oxygen-containing atmosphere. The post-formation treatment, however, has to be carefully performed or the resulting product can still significantly react with oxide glasses.

In particular, when heated in an oxygen-containing atmosphere, silicon nitride can enter into active or passive oxidation mechanisms. The active mechanisms are characterized by a net weight loss of the original silicon nitride product, while the passive mechanisms are characterized by a net weight increase. The active mechanisms are also characterized by continuing reactions with oxygen over time. Accordingly, once the active mechanism has been established, the silicon nitride can continue to react with oxygen, including oxygen available from contact with molten glass.

The passive mechanism, on the other hand, is self-limiting and stops once a silica layer on the order to a few microns forms on the surface of the silicon nitride. It thus forms a protective barrier for the silicon nitride allowing it to come into contact with molten glass with a substantially reduced risk of bubble formation.

The active versus passive mechanism depends on the conditions under which the silicon nitride is exposed to oxygen, as well as the composition of the silicon nitride. The primary variables are temperature, oxygen pressure, and to some extent, time. In particular, the combination of higher temperatures and low oxygen partial pressures promote the active mechanism, e.g., temperatures/$O_2$ combinations of T>1600° C. and $pO_2$<0.1. The time variable is less important, but if the silicon nitride is exposed to oxygen for extended periods of time, the $SiO_2$ layer that forms can be subject to spalling, which can make the material susceptible to the active mechanism.

As to composition, silicon nitrides which have more sintering aids are more likely to exhibit the active mechanism, while silicon nitrides which have less aids are less susceptible. Significantly, sintering aids tend to diminish silicon nitride's creep properties so that keeping such aids at low levels is beneficial both for the physical and for the chemical properties of the material. Some sintering aids are generally required to avoid the need for extreme measures to densify silicon nitride, but in general terms, the sintering aids should be held to be less than 10 wt. %.

In view of the foregoing, the silicon nitride employed in the isopipes disclosed herein is produced in a low oxygen atmosphere, e.g., an inert atmosphere, so that the amount of sintering aids can be kept below the 10 wt. % level. Thereafter, the silicon nitride is machined into a configuration suitable for use as an isopipe. This structure is then treated in an oxygen-containing atmosphere and at a temperature selected to promote the passive mechanism and to inhibit the active mechanism (the "post-formation treatment"). For example, the post-formation treatment of the machined silicon nitride can take place in air at a temperature on the order of 1200° C. for a period of time of at least 24 hours. At such time, the silicon nitride is found to have a silica layer on its exposed surfaces having a thickness which is usually greater than about 2 microns and less than about 50 microns. The thickness of this layer can be determined by taking a cross-section of the material and examining it by SEM. In some cases, a $Si_2N_7O$ interlayer will also be seen between the silicon nitride material and the outer silica layer.

After the post-formation treatment, the isopipe is ready for contact with molten glass, e.g., LCD glass, and exhibits minimal formation of nitrogen bubbles. It should be noted that if desired, the post-formation treatment can be performed in place in the fusion machine if the muffle in which the isopipe is mounted is constructed so as to be able to generate a sufficiently high temperature to perform the treatment. (As known in the art, to protect the molten glass from contamination and to control the glass' temperature, during use, isopipes are surrounded by muffles which are made of refractory materials and equipped with heating elements for adjusting the temperature within the muffle.)

It should be noted that the package of one or more sintering aids used with the silicon nitride needs to be selected with the particular glass that is to be formed using the silicon nitride isopipe in mind. For example, alumina and yttria are commonly used as sintering aids for silicon nitride. Between the two, yttria may be preferable for various glasses since it has a lower diffusion rate than alumina and is less compatible with most common glasses, including LCD glasses, thus making it less likely to combine with the glass and produce undesirable devitrification.

Silicon nitride blocks suitable for making isopipes, e.g., blocks having a length greater than 1.5 meters, can be made in various ways. For example, one can start with a mixture of silicon nitride powder and one or more sintering aids. As discussed above, the weight percent of the sintering aids is less than or equal to 10% and in some embodiments, less than or equal to 7 wt. %. Suitable sintering aids include silica, yttria, alumina, and combinations thereof.

In a study of oxidation behavior of silicon nitride, Themelin et al. describe a compatibility triangle which results in a stable silica layer when yttria is used as a sintering aid. See Themelin et al., "Oxidation Behavior of a Hot Isostatically Pressed Silicon Nitride Material," Journal De Physique IV, Vol. 3, December 1993, pages 881-888. The reference identifies particular temperature ranges and oxygen concentrations which result in the final product being in the compatibility triangle. Similar compatibility triangles can be constructed for other sintering aids, or combinations of aids, using techniques of the type employed in the Themelin et al. reference.

In some cases, it may be desirable to include a source of silicon in the original batch materials, e.g., silica as a sintering aid, so that the final silicon nitride material is silicon rich, e.g., 1 wt. % silicon rich. Such additional silicon helps minimize the formation of nitrogen bubbles during use of the isopipe.

The powdered batch materials can be formed into a block suitable for making an isopipe using conventional ceramic processing techniques. See, for example, Reed, James S., Principles of Ceramics Processing, 2nd Edition, Wiley Interscience, New York, 1995. For example, a green body can be formed using the powder by a process that comprises, for example, uniaxial pressing, isostatic pressing, extrusion, slip cast molding, gel casting, or a combination thereof. In particular, the green body can be formed with isostatic pressing, with low pressure isostatic pressing, or without isostatic pressing, as appropriate to the application.

The green body, once formed, is fired to produce a block of silicon nitride of suitable dimensions to form an isopipe. Due to the very strong covalent bonds in the material, classic sintering in atmospheric air will not take place for most compositions. Quasi-traditional sintering, e.g., pressure-less or atmospheric sintering, can be performed by using large amounts of sintering aids and/or extremely small particle sizes. However, as discussed above, excessive amounts of sintering aids leads to degraded physical properties of the final product, especially high temperature ones. It also promotes the undesirable active mechanism of $SiO_2$ formation. Accordingly, the firing of the silicon nitride blocks disclosed herein is performed in a substantially inert atmosphere, i.e., an atmosphere having a $pO_2$ of less than 0.1 (e.g., an atmosphere having a $pO_2$ of less than 0.01). The firing can be performed at a temperature in the range of 1700-2000° C., although higher and lower temperatures can be used if desired.

To obtain high densities, pressure-assisted firing is employed, e.g., hot pressing, sinter-HIP or straight HIP (hot isostatic pressing). Even in these cases, some sintering aids are normally used, usually in the 2-10 mol % range. They are designed to form a liquid at the sintering temperature and pressure, and enable liquid phase sintering. Once the material is dense, post-treatments are possible to affect the final physical nature of the sintering aid phase. However, thermal treatments need to be used with care since they can cause primary retraction to triple grain junctions and re-crystallization of formed secondary glassy phases. In some cases, crystallization of grain boundaries may be beneficial in terms of the silicon nitride's interaction with the molten glass and its creep behavior.

Table 1 sets forth some examples of silicon nitride based materials produced by various processing routes and the resulting properties. The abbreviations used in this table are as follows: RBSN—reaction bonded silicon nitride (e.g., a silicon or silicon+silicon nitride green body is heat treated in $N_2$ to convert the Si to $Si_3N_4$); HPSN—hot pressed silicon nitride; SSN—sintered silicon nitride; SRBSN—sintered reaction bonded silicon nitride; HIP-SN—hot isostatic pressed silicon nitride; and SiAlON—Silicon-Aluminum-Oxygen-Nitrogen (a variant of $Si_3N_4$ where alumina is used in sufficient quantity to force significant solid solution). The property values in Table 1 are taken from the Ceramics & Glass Handbook, Vol 4. pg. 815.

Once formed, the silicon nitride block is machined into a configuration suitable for use as an isopipe in a fusion process. The isopipe can consist of a single block of silicon nitride or it can be made of multiple pieces, some or all of which are composed of silicon nitride. Whatever configuration is chosen, the isopipe will have at least one surface which comes into contact with molten glass and is composed of silicon nitride with a protective silica layer formed on the silicon nitride after it has been machined. As discussed above, the protective silica layer is formed by a post-formation treatment, i.e., by exposing the machined surface to a partial pressure of oxygen equal to or greater than 0.1 (e.g., a partial pressure equal to or greater than 0.2) at an elevated temperature, e.g., a temperature equal to or greater than 1,000° C. (e.g., a temperature on the order of 1200° C.), for an extended period of time, e.g., in one embodiment, for at least 12 hours, and in another embodiment, for at least 24 hours. As also discussed above, the conditions used in the post-formation treatment are selected to promote the passive oxidation mechanism and to inhibit the active mechanism, where the passive mechanism is characterized by a net increase in the weight of the part and the active mechanism by a net decrease.

The post-formation treatment can be performed off-line or after the isopipe has been installed in the fusion machine. In either case, the treatment can be performed by exposing the machined surface to the oxygen by using air as a treatment gas or by preparing a gas mixture containing oxygen at a partial pressure of at least 0.1. As a further alternative, the treatment can be performed by exposing the surface to a heated liquid, e.g., molten glass, whose $pO_2$ is equal to or greater than 0.1.

As noted above, historically, zircon's creep resistance at high temperature has made it a suitable choice for the substrate sizes and glass types used to date in the display industry. However, as also noted above, there has been an ever increasing demand by display manufacturers for larger substrates, as well as glasses with higher performance properties, specifically, glasses with lower susceptibilities to dimensional changes (e.g., compaction) as a result of heating during the display manufacturing process. High strain point glasses can provide the desired dimensional stability. However, because the fusion draw process operates over a narrow viscosity range of ~10,000 P at the weir to ~300,000 P at the root, a change to a high strain point glass requires an increase in the operating temperature of the isopipe in order for the high strain point glass to exhibit these viscosity values at the weir and root.

Isopipes made from commercially available zircon are not able to withstand these higher temperatures, while still having practical configurations (practical heights) and use lifetimes. For example, the intrinsic rate of creep for commercially available zircon has been observed to increase by a factor of more than 30 when going from 1180 to 1250° C. (see Table 2). Accordingly, fusion formation of a glass substrate having a strain point that is ~70° C. higher than current glasses at the same width would require a 5.3 fold increase in the height of the isopipe to maintain even the most minimal of practical lifetimes. In addition to the increase in the rate of creep of zircon, the numbers and size of defects resulting from dissolution of zircon into the glass will increase with temperature. For these reasons, use of a zircon isopipe to fusion form higher strain point glasses is not likely to be practical.

Similarly, even at the temperatures used with current display glasses, commercially available zircon cannot be used to produce wider substrates without substantial decreases in lifetimes and/or substantial increases in heights. As will be evident, the deficiencies of commercially available zircon are even more pronounced in the case of larger substrates made of high strain point glasses.

The creep performance for silicon nitride is orders of magnitude superior to zircon. Table 2 illustrates this advantage of silicon nitride compared to zircon. The data in this table is for a hot pressed commercially available $Si_3N_4$ material identified by the product number NC132. The data was obtained from NASA/TM—2000-210026, Silicon Nitride Creep Under Various Specimen-Loading Configurations, Sung R. Choi, Ohio Aerospace Institute, Brook Park, Ohio; Frederic A. Holland, Glenn Research Center, Cleveland, Ohio Available from NASA Center for Aerospace Information 7121 Standard Drive Hanover, Md. 21076. Both the zircon data and the silicon nitride data are based on a flexural creep strain rate evaluation based on bending. As shown in the table, the silicon nitride samples were tested at higher temperatures and stresses than the zircon samples. Also, the silicon nitride test samples were shorter in length and tested in general for longer times (100's of hrs). The values set forth in Table 2 are the averages of the steady state creep strain rates at the start and end of test. The starting creep rates were higher than the ending rates, but substitution of those into the reported averages above does not alter the outcome.

Table 2 clearly shows that the major improvement in creep strain rates achieved through the use of silicon nitride. Comparing the lowest stress silicon nitride material to the standard zircon material gives a three order of magnitude improvement in creep strain rate, at 4× the applied stress and 120° C. hotter test condition. Advanced zircon, which was designed to minimize creep rate does better, but is still two orders of magnitude below the silicon nitride material.

Table 3 provides a further comparison between silicon nitride and zircon. As can be seen in this table, silicon nitride has a higher decomposition temperature, 1900° C. vs. 1625° C., than zircon, thus enabling high temperature operation; silicon nitride has an approximately 30% lower density than zircon, which, all other things being equal, reduces the load on the isopipe, which is the source of creep; silicon nitride has an ~5-6× improvement in MOR at room temperature and >3-4× at elevated temperature; silicon nitride has a ~2-3× improvement in fracture toughness; silicon nitride has a ~20-25% lower thermal expansion coefficient; and silicon nitride has a higher thermal shock parameter, although in this case, the measurement technique used for the $Si_3N_4$ and zircon materials may have been different. The values in this table are from the Ceramics and Glasses Handbook, Vol. 4. Pgs 30, 191, 316, 807, 808, 815. It should be noted that non-oxide properties vary significantly for a given material, and the values in Table 3 do not represent the extreme low or high values but merely reference values.

Without intending to limit it any manner, the following example illustrates an embodiment of the present disclosure.

EXAMPLE 1

A silicon nitride isopipe is prepared by pressurized firing in a nitrogen atmosphere of a green body composed of silicon nitride powder and less than 10 wt. % sintering aids. The fired green body has a length greater than 1.5 meters, a height greater than 0.25 meters, and a depth greater than 0.1 meters. The fired green body is machined into an isopipe configuration. The machined isopipe is mounted in a fusion machine and heated in air to a temperature of 1200° C. The isopipe is held at this temperature for 24 hours during which time a silica layer is formed on the machined surface which exhibits substantially only a passive oxidation mechanism.

Thereafter, the isopipe is used in the fusion process to produce a ribbon of glass which is cut into sheets which, after finishing, are used as substrates for liquid crystal displays.

The molten glass remains in contact with the isopipe for substantial periods of time at elevated temperatures. The surface of the isopipe is found to be compatible with the molten glass in that the finished substrates exhibit a defect level, including crystals, blisters, and other onclusions and inclusions, below 0.001 defects per pound. The silicon nitride material has a flexural creep strain rate at 1250° C. and 1000 psi that is less than $1\times10^{-8}$/hour and the isopipe exhibits substantially less sag than a zircon isopipe of the same dimensions and configuration used under the same conditions.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

|  | RBSN | HPSN | SSN | SRBSN | HIP-SN | Sialon |
|---|---|---|---|---|---|---|
| % Relative Density [—] | 70-88 | 99-100 | 95-99 | 93-99 | 99-100 | 97-99 |
| Young's modulus [GPa] | 120-250 | 310-330 | 260-320 | 280-300 | — | 300 |
| Thermal Expansion [$10^{-6}$/° C.] | 3.0 | 3.2-3.3 | 2.8-3.5 | 3.0-3.5 | 3.0-3.5 | 3.0-3.7 |
| Poisson's Ratio [—] | 0.20 | 0.27 | 0.25 | 0.23 | 0.23 | 0.23 |
| 25° C. MOR Strength [MPa] | 150-350 | 450-1000 | 600-1200 | 500-800 | 600-1200 | 750-950 |
| 1350° C. Strength [MPa] | 140-340 | 250-450 | 340-550 | 350-450 | 350-550 | 300-550 |
| Fracture Toughness [MPa * m$^{1/2}$] | 1.5-2.8 | 4.2-7.0 | 5.0-8.5 | 5.0-5.5 | 4.2-7.0 | 6.0-8.0 |

TABLE 2

|  | Temperature ° C. | Stress (Mpa) | Stress (psi) | Strain Rate ($10^{-6}$/hr) |
|---|---|---|---|---|
| Zircon | 1180 | 6.9 | 1000 | 1.23 |
| Zircon | 1250 | 6.9 | 1000 | 45.2 |
| Advanced Zircon | 1180 | 6.9 | 1000 | 0.22 |
| $Si_3N_4$ | 1300 | 29 | 4207 | 0.00103 |
| $Si_3N_4$ | 1300 | 57 | 8268 | 0.00172 |
| $Si_3N_4$ | 1300 | 81 | 11749 | 0.0138 |
| $Si_3N_4$ | 1300 | 115 | 16681 | 0.0177 |
| $Si_3N_4$ | 1300 | 162 | 23499 | 0.0217 |

TABLE 3

| Property | Zircon | $Si_3N_4$ |
|---|---|---|
| Melt/Decomp. (° C.) | Decomp 1625 | 1900 |
| Lattice Parameters (Å) | a = 6.035 c = 5.979 | a = 7.775 c = 5.16 |
| Density (g/cm$^3$) | 4.669 | 3.2-3.5 |
| Thermal Expansion Coefficient (ppm/K) | $\alpha_a$ = 3.2 $\alpha_c$ = 5.4 Average = 4.1 | Average 3.0-3.4 |
| Elastic Modulus (GPa) - 25° C. | 199 | 304 |
| Poisson's ratio | 0.266 | 0.25 |
| Modulus of rupture (MPa) - 25° C. | 148 | 850 |
| 1200° C. | 103 | 340-550 (1350 C.) |
| Thermal shock resistance (K) | 160 | 700 |
| Fracture Toughness MPa m$^{1/2}$ |  | 6.1 |

What is claimed is:

1. An isopipe for making a glass or a glass-ceramic comprising a body for use in a fusion process, said body comprising a silicon nitride refractory material that:

(a) contacts the glass or glass-ceramic in a molten state during use of the isopipe, and
(b) has a flexural creep strain rate at 1250° C. and 1000 psi that is less than $1\times10^{-6}$/hour, wherein:
(i) said body comprises inwardly sloping sides which meet at a root;
(ii) the silicon nitride refractory material is produced in block form in an atmosphere having a pO$_2$ of less than 0.1 using less than 10 weight percent of one or more sintering aids;
(iii) the block form of silicon nitride refractory material is machined into the body; and
(iv) the machined block of silicon nitride refractory material is treated by exposure to a partial pressure of oxygen equal to or greater than 0.1 for a period of time and at a temperature sufficient to form a SiO$_2$ layer which exhibits substantially only a passive oxidation mechanism, said SiO$_2$ layer serving as a protective barrier for further oxidation of the silicon nitride during use of the isopipe.

2. The isopipe of claim 1 wherein the oxygen treatment takes place at a temperature above 1000° C.

3. The isopipe of claim 2 wherein the oxygen treatment is conducted for at least 12 hours.

4. The isopipe of claim 1 wherein the machined silicon nitride refractory material is exposed to the oxygen in a liquid phase.

5. The isopipe of claim 1 wherein the machined silicon nitride refractory material is exposed to the oxygen in a gas phase.

6. The isopipe of claim 1 wherein the machined silicon nitride refractory material is exposed to the oxygen after having been installed in a fusion draw machine.

7. The isopipe of claim 1 wherein the one or more sintering aids are selected from the group consisting of silica, yttria, alumina, and combinations thereof.

8. The isopipe of claim 1 wherein the block form of the silicon nitride refractory material has a length of at least 1.5 meters.

9. The isopipe of claim 1 wherein the silicon nitride refractory material comprises at least 85 weight percent $Si_3N_4$.

10. The isopipe of claim 1 wherein the silicon nitride refractory material comprises at least 36 weight percent N and at least 54 percent Si.

11. A method of making an isopipe which has a configuration adapted for use in a fusion process comprising in order:

(a) providing a block of a silicon nitride refractory material which was produced in an atmosphere having a pO$_2$ of less than 0.1 using less than 10 weight percent of one or more sintering aids;
(b) machining the block into an isopipe configuration; and (c) exposing the machined block to a partial pressure of oxygen equal to or greater than 0.1 for a period of time and at a temperature sufficient to form a $SiO_2$ layer which exhibits substantially only a passive oxidation mechanism, said $SiO_2$ layer serving as a protective barrier for further oxidation of the silicon nitride during use of the isopipe, wherein said isopipe configuration comprises inwardly sloping sides which meet at a root.

12. The method of claim 11 wherein the exposure to oxygen in step (c) takes place at a temperature above 1000° C.

13. The method of claim 12 wherein the exposure to oxygen in step (c) is conducted for at least 12 hours.

14. The method of claim 11 wherein the one or more sintering aids are selected from the group consisting of silica, yttria, alumina, and combinations thereof.

15. The method of claim 11 wherein the silicon nitride refractory material comprises at least 36 weight percent N and at least 54 percent Si.

16. A method for reducing the sag of an isopipe used in a fusion process that produces glass or glass-ceramic sheets comprising forming said isopipe from a silicon nitride refractory material that is:

(a) produced in block form in an atmosphere having a $pO_2$ of less than 0.1 using less than 10 weight percent of one or more sintering aids, (b) machined into an isopipe configuration, and (c) exposed to a partial pressure of oxygen equal to or greater than 0.1 for a period of time and at a temperature sufficient to form a $SiO_2$ layer which exhibits substantially only a passive oxidation mechanism, said $SiO_2$ layer serving as a protective barrier for further oxidation of the silicon nitride during use of the isopipe, wherein said isopipe configuration comprises inwardly sloping sides which meet at a root.

17. The method of claim 16 wherein the exposure to oxygen in step (c) takes place at a temperature above 1000° C.

18. The method of claim 17 wherein the exposure to oxygen in step (c) is conducted for at least 12 hours.

19. The method of claim 16 wherein the one or more sintering aids are selected from the group consisting of silica, yttria, alumina, and combinations thereof.

20. The method of claim 16 wherein the silicon nitride refractory material comprises at least 36 weight percent N and at least 54 percent Si.

* * * * *